United States Patent [19]

Carlson

[11] Patent Number: 5,022,178
[45] Date of Patent: Jun. 11, 1991

[54] FISHING RIG

[76] Inventor: Donald P. Carlson, Box 67, Valley View Rd., Townsend, Wis. 54175

[21] Appl. No.: 732,138

[22] Filed: May 9, 1985

[51] Int. Cl.⁵ ............................................. A01K 83/06
[52] U.S. Cl. ...................................... 43/44.82; 43/34; 43/37
[58] Field of Search ...................... 43/44.82, 44.83, 34, 43/35, 36, 37, 44.98, 44.88, 42.04, 15, 42.49, 42.24, 42.02

[56] References Cited

U.S. PATENT DOCUMENTS

| | | | |
|---|---|---|---|
| 408,347 | 8/1889 | Hubbard | 43/34 |
| 2,087,955 | 7/1937 | Middlemiss | 43/37 |
| 2,220,559 | 11/1940 | Voigt | 43/34 |
| 2,619,759 | 12/1952 | Penninger | 43/37 |
| 2,640,291 | 6/1953 | Garner | 43/37 |
| 2,700,843 | 2/1955 | Werner | 43/44.82 |
| 3,543,430 | 12/1970 | Brokaw | 43/42.02 |
| 3,740,890 | 6/1973 | Aron | 43/37 |

Primary Examiner—Kurt Rowan
Attorney, Agent, or Firm—Hill, Van Santen, Steadman & Simpson

[57] ABSTRACT

A fishing rig for live or artificial bait has a bendable member mounted between at least two hooks, particularly treble hooks, the hooks being mounted with respect to a leader such that when one hook is set in a fish, the bendable member bends upon a pull of the leader and the other hook moves toward the set hook. The bending of the bendable member forces the other hook into a set condition and enlarges the transverse width of the rig within the fish so that a double hooking action is guaranteed.

17 Claims, 2 Drawing Sheets

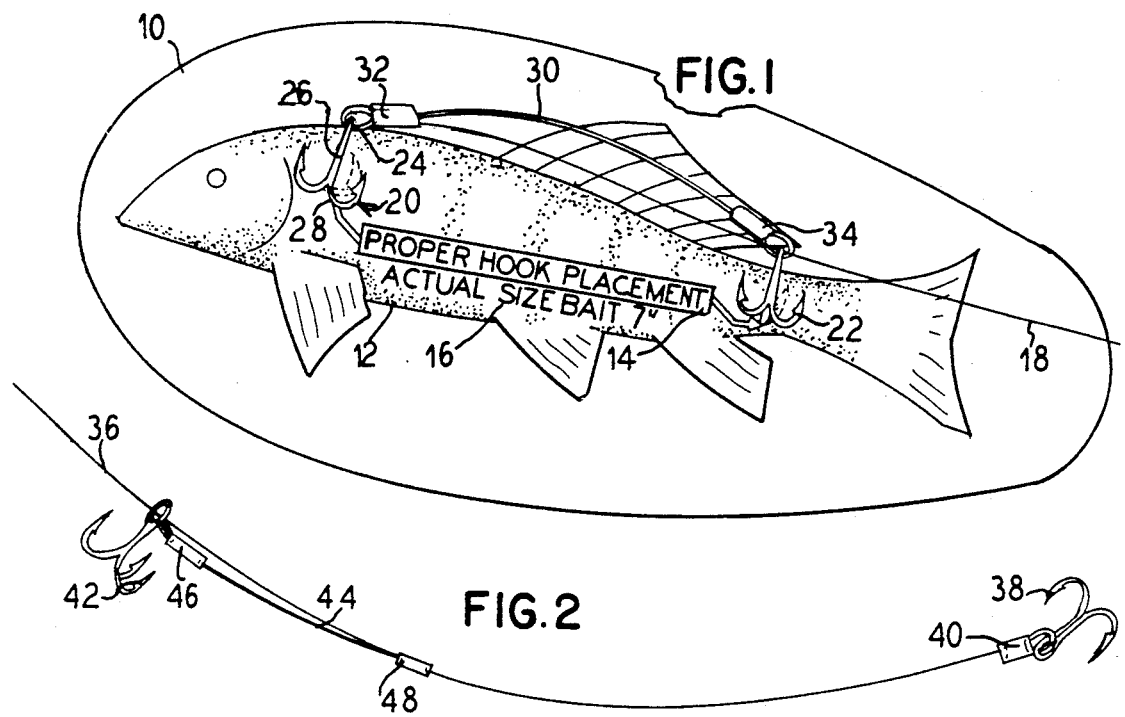
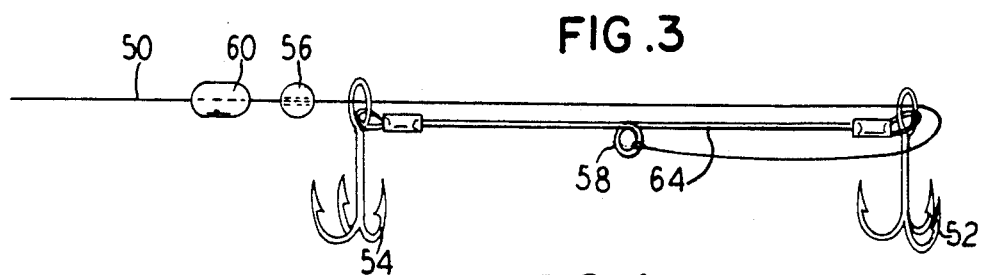
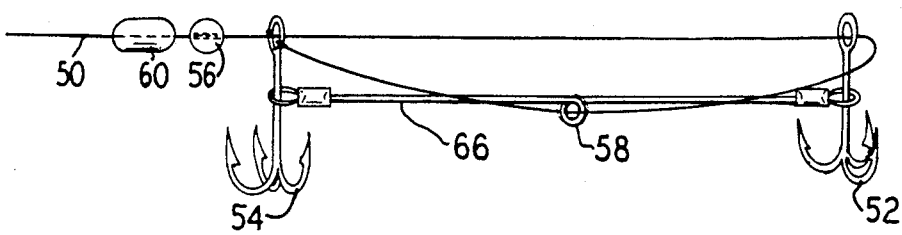
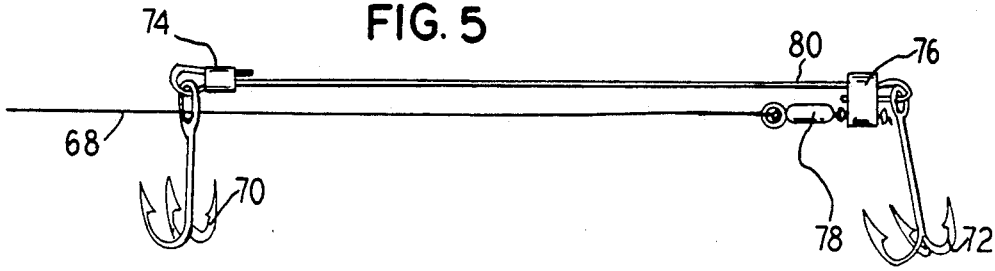

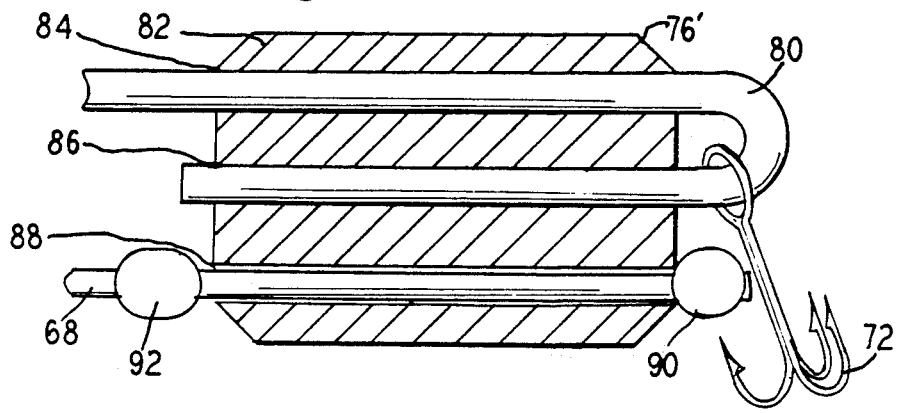
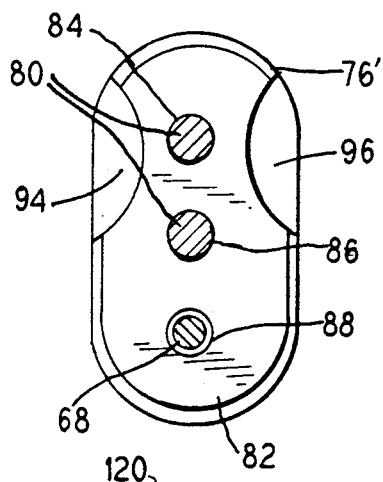
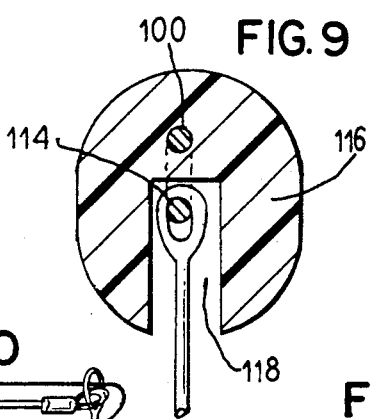
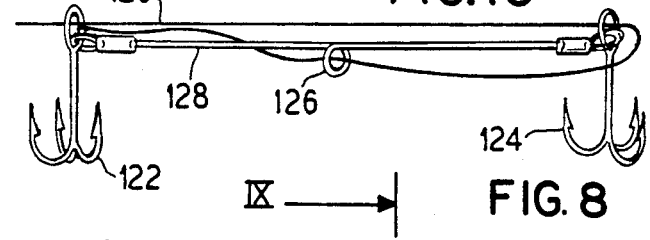
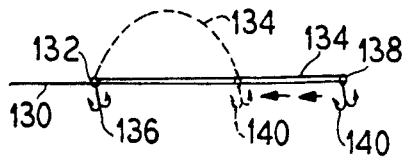
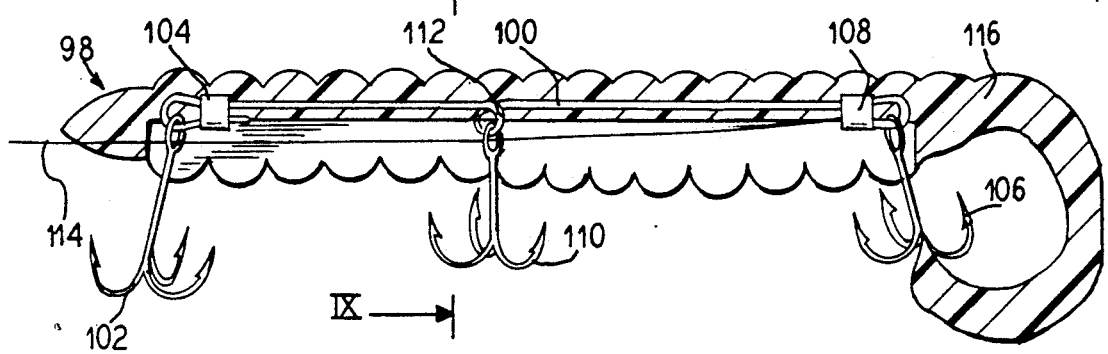

FISHING RIG

BACKGROUND OF THE INVENTION

1. Field of the Invention

The present invention relates to a fishing rig, and is more particularly concerned with a fishing rig, using live or artificial bait, in which a plurality of hooks are connected to a bendable member to prevent dislodgement of the hooks and following of the hooks one after another along the same exit path out of the fish.

2. Description of the Prior Art

D.McLean in his U.S. Pat. No. 17,803, issued July 14, 1857, discloses a pair of hooks which are pivotally connected to a line and to one another and which have barbs facing one another. An elastic cord is attached to one of the hooks to maintain the one hook at an angle and away from the other hook until a fish engages the other hook. The retained hook is then moved to be driven into the gills or some other part of the fish, thereby providing a double hooking action.

A similar hook arrangement is disclosed by A.Paysen in his U.S. Pat. No. 959,587, issued May 31, 1910. This arrangement, however, does not use the elastic cord. Many other multiple hook arrangements are known in the art. These arrangements, however, provide that the hooks are attached to a leader and merely follow the same exit path if the hooks are both swallowed by a fish. One such structure is disclosed by B.S.King in his U.S. Pat. No. 2,690,260 and another such arrangement is disclosed by W.E. Norton in his U.S. Pat. No. 2,792,662.

There are many rigs on the market for bait fishing. All of these rigs, primarily because of the following of one hook after another, allow for losing fish which have struck the bait. Other multi-hook rigs will not hook a fish which has taken a bait fish. The cause of this can be found to be that the hooks remain in the bait fish, which, when pulled, pull out of the striking fish without the hooks setting at all.

Also, multi-hook rigs have been found to have little or no hooking power even after the first hook is in place; if the set hook breaks or fails to hold, the fish is likely to get away if the other hook does not set.

SUMMARY OF THE INVENTION

It is therefore the object of the present invention to provide at least a second hook on a rig, the second hook having its own power to hook when the first hook is set in place.

It has been found that two hooks are better than one only if they both hook in a fish. Many times the second hook stays motionless on a standard rig after the first hook is set.

Hooks also tend to jerk loose when a fish struggles.

It is therefore also an object of the invention to provide for the setting of at least two hooks in a rig that will also tighten the grip of the hooks and cause the hooks to stay in place when a fish struggles. A bendable member on the rig achieves this. According to the invention, a rig that cannot be pulled straight out of a fish once a first hook is set and/or the second hook is set is achieved. The hooks engage in a 180° direction of motion. Therefore, a double hooking action is developed and a double holding power is achieved by the attached bending member.

Heretofore, it was also a problem of having a leader system which a large fish could not grab and foul. According to the present invention, fouling cannot occur for any baitswallowed fish, if the rig size is selected such that the fish can swallow the rig.

For live bait fishing, it is suggested that the rig be attached to a bait of predetermined size and that the leader is connected to a fishing line by way of a swivel. The bait is then cast into a fishing area and permitted to swim freely. When a gatefish swallows the bait, the fisherman tightens his line to "set the hooks".

The rig of the present invention has the following advantages:

1. The rig can be swallowed by a game fish while attached to a bait and be undetected by the fish because of its size, shape and position on a given bait;
2. Once swallowed, the rig will have the ability to remove itself from the bait and hook the fish, first, by the fisherman pulling on the leader and, second, by the motion caused by the bending of the bendable member which causes the two hooks to move toward one another and move the bendable member out of a linear relationship to force the hooks into the fish;
3. Once the fish hook is in place in the fish, the second hook on the rig is capable of also hooking because of the bending of the bendable member and thus doubling the hold on a fish;
4. Once both hooks are in place, they can be pulled tighter and into a greater hooking relationship by the application of additional tensile forces on the leader and thereafter a hooked fish can actually be played on an essentially loose line and will not be capable of throwing out the hooks;
5. Extra strong stainless steel leaders and extra strong hooks prevent the fish from damaging the rig; and
6. The leader is provided with additional length to protect the fish from reaching and breaking the line attached to the leader.

In the engaged condition, the bending member tends to bias the hooks away from one another when tensile forces are released on the leader so that the hooks tend to increase and maintain their hold.

According to the invention, in a basic form, the rig comprises a pair of hooks each typically having an eye, a shank and barb or barbless hook section. One of the hooks is fixed to a leader and the other is slidably mounted on the leader. A bending member is located between the hooks. As the leader is pulled through the first hook, fixed in a fish, the bending member bends and the second hook moves towards the first hook and is forced into engagement and setting in the fish.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a plan view of a first embodiment the invention shown as packaged with the suggested size of live bait;

FIG. 2 is an elevation of another embodiment of the invention in which one of the hooks and the bending member are both slidable on the leader;

FIG. 3 is an elevation of another embodiment of the invention;

FIG. 4 is an elevation of another embodiment of the invention;

FIG. 5 is an elevation of another embodiment of the invention;

FIG. 6 is a sectional view of a crimp device which may be employed in practicing the invention;

FIG. 7 is an end view of the device of FIG. 6;

FIG. 8 is a view of an artificial lure embodiment;

FIG. 9 is a sectional view taken generally along the parting line IX—IX of FIG. 8;

FIG. 10 shows another embodiment of the invention, and

FIG. 11 is a schematic illustration showing the bending of the bending member.

DESCRIPTION OF THE PREFERRED EMBODIMENTS

Referring to FIG. 1, a first embodiment of the invention is illustrated, in combination with a display and mounting card. The card 10 comprises a figure of a bait 12 of a predetermined size for the particular rig in question and carries indicia 14, 16 indicating the proper hook placement on such bait and the actual size of the bait. When applying the rig to the bait, at least one barbed hook from each of the two hooks are pierced into the bait at the indicated locations.

The rig itself comprises a leader 18 which may be attached to a fishing line by way of a swivel or the like, a hook 20 connected to the leader and a hook 22 slidably carried by the leader. The hooks 20 and 22 each include an eye 24, a shank 26 and a barb section 28 having one of more barbed or barbless hooks.

Between the hooks is a bending member 30 connected at its one end by a crimp device 32 to the hook 20 and the leader 18 and at its other end to the eye of the hook 22.

As is evident, with the hook 22 set in a fish, a pull on the leader 15 causes the leader to travel through the eye of the hook 22 to draw the hook 20 toward the hook 22, bend the member 30 (see FIG. 11) within and against the inside of a fish and thus force the hook 20 also into a set condition within the fish. The fish is therefore doubly hooked and with a tensile force on the leader 18, the hooks 22 and 20 cannot possibly exit the fish on the same path. In addition, the member 30 maintains a tension on the hooks to keep them set even when the line goes slack as the fish fights.

Referring to FIG. 2, a leader 36 is provided and has a hook 38 connected to its distal end by way of a loop extending through the eye of a hook and crimped by a crimping device 40. A hook 42 receives the leader 36 through its eye and is connected to a bending member 44 by way of a crimp device 46. The opposite end of the member 44 is slidably connected to the leader 36 by way of a crimp device 48 crimped to the member 44 and slidably receiving the leader therethrough. In this embodiment, with a fish hooked on the hook 42, a pull of the leader 36 causes the hook 42 and the member 44 to slide toward the hook 38. As the slidable crimp device 48 engages the crimp device 40, the member 44 begins to bend and cause the aforementioned double-hooking action. This embodiment, therefore, does not require a specific size of bait, but is adjustable to several sizes of bait and the double-hooking action is slightly, but minimally, delayed.

Referring to FIG. 3, another embodiment of the invention is illustrated in which a leader extends through the eyes of a pair of hooks 52, 54. A pair of bearings 56, 58 are attached to the leader on opposite sides of the hooks and a stop 60, 62 is provided outside of each bearing so that the hooks remain therebetween. The hooks are therefore free to spin about the leader. A bendable member 64 extends between and is connected through the eye of each hook. The connections may be made by the aforementioned crimp devices, or by any other suitable means.

In FIG. 4 another embodiment of the invention is illustrated which is substantially identical to the embodiment of FIG. 3 with the exception that the elongate bendable member 66 is connected to the shanks of the hooks, rather than to the eyes of the hooks.

The two hooks may also be strung on the leader between stops, bearings and the like, with the bending member connected to the eyes or to the shanks of the hooks.

A further embodiment of the invention is illustrated in FIG. 5 in which a hook 70 receives the leader 68 through its eye and has one end of a bending member 80 received through its eye and crimped by a crimping device 74. The opposite end of the bending member extends through another crimping device and through the eye of a hook 72 by way of a crimping device 76 which is connected by a swivel 78 through the leader 68.

Referring to FIGS. 6 and 7 the crimp device 76 is illustrated as comprising a body 82 having three longitudinal bores 84, 86 and 88 extending therethrough. As is evident, the bending member 80 extends in the manner of reentry through both of the bores 84 and 86 and is secured by way of a pair of crimp detents 94, 96.

As in FIG. 5, the leader 68 extends through the bore 88 and is freely movable therein. In a manner different from FIG. 5, the leader 68 is not connected to the crimp device 76 by way of a separate swivel, but the bore 88 constitutes a portion of a swivel including two bearings 90, 92 fixed to the leader 68 at each end of the crimp device 76. As in FIG. 5, the hook 72 is pivotally secured to the crimp device 78 by the passage of the bending member 80 through the eye of a hook.

Turning now to FIGS. 8 and 9, a further embodiment of the invention is illustrated, generally at 98, for an artificial bait, here in the form of a "plastic worm". The bait 98 is seen as comprising the bending member 100 having a hook 102 connected to the forward end by way of a crimp device 104 and a rear hook 106 connected thereto by way of a crimp device 108. Additional hooks 90 may be attached between the front and rear hooks. Here, a third hook 110 is illustrated as being attached centrally of the bending member 100, by way of an intermediate ring 112, such as a split ring.

A leader 114 extends through the artificial bait and is connected to the rear hook 106 by the crimp device 108. The leader, to permit the proper bending action, extends through the eye of each of the hooks 102, 110. This also ensures that the hooks cannot be separated from the leader material even if the bending member breaks.

Further, artificial bait 98 comprises a molded flexible body 116 which totally embeds the bending member and crimp devices. The hooks extend out of the body for access by a fish.

In order to promote the proper contraction and flexing of the lure, the molded body includes an elongate slot 118 receiving the leader 114 so that the leader is freely movable therein and can, in effect, shorten within the body as the hooks move toward one another and the bending loop is formed by the bending member.

Referring to FIG. 10, a preferred embodiment of the invention is illustrated in which the rig provides a more capable hooking action in that the bending action will occur when either hook is held stationary because of an additional leader attachment. In this embodiment, a leader 120 passes through the eye of a first hook 122, then through the eye of a second hook 124 and is then connected to the eye of the hook 122 after passing through an eye 126 of a bendable member 128.

FIG. 11 schematically shows the bending action of the bending member. In FIG. 11 a leader 130 is illustrated as passing through an eye 132 of a bending member 134 and connected to a further eye 138. A pair of hooks 136, 140 are connected to the bending member 134. A pull on the leader 130, as in setting a hook when a fish strikes, causes the bending member to bend into a loop or arc as illustrated by the broken lines.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A fishing rig comprising: a leader;
first and second hooks mounted spaced apart on said leader for relative movement towards one another when said first hook is set and tension is applied to said leader; and
a bending member mounted between said first and second hooks, said bending member bending into a loop as said first and second hooks move toward one another along an arcuate path.

2. The fishing rig of claim 1, wherein: said first hook is slidably mounted on said leader and
said second hook is fixed to said leader; and said bending member is connected to said hooks.

3. The fishing rig of claim 1, wherein: said first hook is slidably mounted on said leader and said
second hook is fixed to said leader; said bending member comprises first and second ends; first mounting means fix said first end to one of said hooks; and second mounting means slidably mount said second end on said
leader, said bending member bending as said first mounting means engages said second mounting means.

4. The fishing rig of claim 3, wherein: said one hook is said first hook.

5. The fishing rig of claim 3, wherein: said one hook is said second hook.

6. The fishing rig of claim 1, wherein: each of said hooks comprises a barb section, an eye and a
shank connecting said eye to said barb section; said leader extends through said eyes; a pair of stops are fixed to said leader on the side of
each hook facing away from the other hook to maintain the hooks therebetween; and said bending member is connected to said hooks.

7. The fishing rig of claim 6, wherein: said bending member is connected to said eyes.

8. The fishing rig of claim 6, wherein: said bending member is connected to said shanks.

9. The fishing rig of claim 6, and further comprising:
a pair of bearings respectively connected between said
stops and said hooks.

10. The fishing rig of claim 1, wherein:
each of said hooks comprises an eye and a barb section depending therefrom;
said leader extending through said eye of said first hook;
said bending member comprises first and second ends respectively extending through said eyes and a bending member body therebetween;
first and second crimp devices respectively secure said ends to said bending member body; and
a swivel connecting said leader to said second crimp device.

11. The fishing rig of claim 10, wherein:
said swivel and said second crimp device are combined and comprise a member of crimpable material including first, second and third bores, said second end of said bending member extending through said first and second bores, a crimp in said member securing said second end of said bending member in said first and second bores, a third bore loosely receiving said leader therethrough, and a pair of bearings fixed to said leader at opposite ends of said member.

12. The fishing rig of claim 1, in combination with:
a mounting card bearing the shape and size of a live bait and indicia indicating correct connection locations of said hooks to said bait; and
means releasably securing said hooks to the connection locations.

13. The fishing rig of claim 1, and further comprising:
a molded body in the shape of a bait with said bending member embedded in said body and said hooks extending out of said body,
said body including an elongate slot having said leader freely movable therein.

14. An artificial fishing lure comprising:
first and second hooks each including a hook section and an eye connected to said barb section;
a bending member including first and second ends respectively pivotally connected to said eyes of said first and second hooks;
a leader extending through said eye of said first hook and connected to said eye of said second hook so that tension on said leader with said first hook set causes said bending member to bend and move said hooks toward one another over an arcuate path; and
a body of molded flexible material embedding said bending member, said hook sections of said hooks extending out of said body,
said body comprising an elongate slot, said leader extending through and freely movable in said slot.

15. The artificial fishing lure of claim 14, and further comprising:
at least one further hook comprising an eye connected to said bending member and receiving said leader therethrough at a point between said first and second hooks, and a hook section extending out of said body.

16. A fishing rig comprising:
a leader including a first end for connection to a fishing line and a second end;

first and second hooks each including an eye mounted on said leader for relative movement towards one another when one of said hooks is set in a fish;

a bendable member connected to said hooks, said bendable member bending into a first loop when said one hook is set to force the other of said hooks into the fish; and a second loop carried by said bendable member, said second end of said leader attached to said second loop.

17. A fishing rig comprising:

a leader including a first end for connection to a fishing line and a second end;

first and second hooks each including an eye mounted on said leader for relative movement towards one another when one of said hooks is set in a fish;

a bendable member connected to said hooks, said bendable member bending into a first loop when said one hook is set to force the other of said hooks into the fish; and a second loop carried by said bendable member, said second end of said leader threaded through said second loop after threading through said eye of said second hook and attached to said first hook.

* * * * *